US011306727B2

(12) United States Patent
Wang

(10) Patent No.: US 11,306,727 B2
(45) Date of Patent: Apr. 19, 2022

(54) FAN DYNAMIC PRESSURE STRUCTURE HAVING A PLASTIC FRAME INTEGRALLY FORMED AROUND AN OIL-CONTAINING SINTERED METAL POWDER BEARING

(71) Applicant: F&P PRECISION CO., LTD., Taipei (TW)

(72) Inventor: Ping-Ling Wang, Taipei (TW)

(73) Assignee: F&P PRECISION CO., LTD., Taipei (TW)

( * ) Notice: Subject to any disclaimer, the term of this patent is extended or adjusted under 35 U.S.C. 154(b) by 447 days.

(21) Appl. No.: 16/591,606

(22) Filed: Oct. 2, 2019

(65) Prior Publication Data

US 2020/0362872 A1 Nov. 19, 2020

(30) Foreign Application Priority Data

May 16, 2019 (TW) ................. 108206157

(51) Int. Cl.
| | | |
|---|---|---|
| *F04D 29/44* | (2006.01) | |
| *F04D 29/056* | (2006.01) | |
| *F04D 29/40* | (2006.01) | |
| *F04D 29/66* | (2006.01) | |
| *F16C 17/02* | (2006.01) | |
| *F16C 33/10* | (2006.01) | |

(52) U.S. Cl.
CPC .......... *F04D 29/056* (2013.01); *F04D 29/40* (2013.01); *F04D 29/66* (2013.01); *F16C 17/02* (2013.01); *F16C 33/1095* (2013.01); *F16C 2220/20* (2013.01); *F16C 2360/46* (2013.01)

(58) Field of Classification Search
CPC ..... F04D 25/062; H02K 5/1675; H02K 7/085

USPC ......................................................... 415/200
See application file for complete search history.

(56) References Cited

U.S. PATENT DOCUMENTS

| | | | | |
|---|---|---|---|---|
| 5,264,748 A * | 11/1993 | Ootsuka | .................. | F16C 17/04 |
| | | | | 310/90 |
| 6,084,328 A * | 7/2000 | Yamashita | ........... | H02K 5/1675 |
| | | | | 310/90 |
| 6,267,567 B1 * | 7/2001 | Hsieh | ................... | F04D 29/0513 |
| | | | | 417/423.12 |
| 6,700,257 B2 * | 3/2004 | Lin | ........................ | H02K 5/163 |
| | | | | 310/90 |
| 6,720,694 B2 * | 4/2004 | Horng | ................. | H02K 5/1675 |
| | | | | 310/90 |

(Continued)

*Primary Examiner* — Long T Tran
*Assistant Examiner* — James J Kim
(74) *Attorney, Agent, or Firm* — CKC & Partners Co., LLC

(57) ABSTRACT

A fan dynamic pressure structure having a plastic frame integrally formed around an oil-containing sintered metal powder bearing includes an oil-containing sintered metal powder bearing, a plastic frame having a middle tube integrally formed around a peripheral of a bushing body of the oil-containing sintered metal powder bearing, a blade assembly having an axial shaft penetrating through a shaft hole of the oil-containing sintered metal powder bearing, the axial shaft protruding downwardly and having an annular groove, and an annular dynamic pressure piece having an insertion hole and an annular body surrounding the insertion hole. The insertion hole is engaged with the annular groove of the fan assembly, the annular body has a plurality of curved radial dynamic pressure ditches on a surface adjacent to the oil-containing sintered metal powder bearing, of the annular body.

4 Claims, 4 Drawing Sheets

(56) References Cited

U.S. PATENT DOCUMENTS 7,342,336 B1* 3/2008 Horng ................ H02K 5/1675
  310/90
7,622,837 B2* 11/2009 Saito .................... F16C 33/107
  310/90

* cited by examiner

FAN DYNAMIC PRESSURE STRUCTURE HAVING A PLASTIC FRAME INTEGRALLY FORMED AROUND AN OIL-CONTAINING SINTERED METAL POWDER BEARING

RELATED APPLICATIONS

This application claims priority to Taiwan Application Serial Number 108206157, filed May 16, 2019, which is herein incorporated by reference.

TECHNICAL FIELD

The present disclosure generally relates to a fan. More particularly, the present disclosure relates to a dynamic pressure structure of a fan.

BACKGROUND

A fan is usually mounted on a frame equipped with a motor structure such as silicon steel sheets and magnets, and a bearing is disposed at the center of the frame for pivoting the axial shaft of the fan blade so that the fan blade can be smoothly rotated.

There are many types of bearings, and oil-containing sintered metal powder bearings are widely used because they are easy to manufacture and low in cost.

The oil-containing sintered metal powder bearing and a plastic frame are provided for assembling a conventional combination structure of the oil-containing sintered metal powder bearing and the plastic frame. Then, the oil-containing sintered metal powder bearing is press-fitted into the middle tube of the plastic frame.

However, this kind of combination structure has the following disadvantages: the press-fit working time and manpower are increased, the pressing force is likely to cause damage to the oil-containing sintered metal powder bearing and the middle tube of the plastic frame so as to increase the defect rate, the pressing force is likely to cause deformation of the middle tube and the oil-containing sintered metal powder bearing, the strong pressing force may also deform the inner wall of the shaft hole of the oil-containing sintered metal powder bearing, and therefore the axial shaft may cause the structural friction with the foregoing inner or outer deformation and result in oil leakage and oil squeaking so as to cause the axial shaft to be stuck.

In addition, when the axial shaft of the fan blade is disposed in the oil-containing sintered metal powder bearing, a retaining ring is embedded in the protruding end of the bearing to prevent the fan blade out of the frame. However, the conventional retaining ring is a smooth C-shaped retaining ring with a poor oil storage effect. When the fan blade is rotated at an extremely high speed, the retaining ring is easily lifted upwards and may rub on the end surface of the oil-containing sintered metal powder bearing so as to cause noise, vibration and even the fan blade to escape from the frame.

SUMMARY

One objective of the embodiments of the present invention is to provide a fan dynamic pressure structure having a plastic frame integrally formed around an oil-containing sintered metal powder bearing to improve the function and efficiency of a fan.

To achieve these and other advantages and in accordance with the objective of the embodiments of the present invention, as the embodiment broadly describes herein, the embodiments of the present invention provides a fan dynamic pressure structure having a plastic frame integrally formed around an oil-containing sintered metal powder bearing including an oil-containing sintered metal powder bearing, a plastic frame, a fan assembly and an annular dynamic pressure piece. The oil-containing sintered metal powder bearing has a bushing body, and the bushing body has a shaft hole in the center thereof. The plastic frame has a middle tube and a chassis, and the middle tube is integrally formed and surrounded a peripheral of the bushing body. The fan assembly has a plurality of fan blades and an axial shaft in which the axial shaft is disposed in a center of the fan assembly and the axial shaft penetrates through the shaft hole of the oil-containing sintered metal powder bearing and protrudes downwards, and the axial shaft has an annular groove. The annular dynamic pressure piece has an insertion hole and an annular body is surrounding the insertion hole. The insertion hole is fixed in the annular groove of the fan assembly, and the annular body has a plurality of curved radial dynamic pressure ditches on a surface adjacent to the oil-containing sintered metal powder bearing.

In some embodiments, the annular dynamic pressure piece has a plurality of curved radial dynamic pressure ditches on a surface opposite to the oil-containing sintered metal powder bearing.

In some embodiments, the axial shaft has a cone end portion at an end portion of the axial shaft.

In some embodiments, the cone end portion has an inclined surface, and the insertion hole of the annular dynamic pressure piece has an edge wall, on an inner wall of the insertion hole, corresponding to the inclined surface.

Hence, the damage and deformation, caused by the conventional press fit process, of the fan dynamic pressure structure having a plastic frame integrally formed around an oil-containing sintered metal powder bearing can be avoided because that the plastic frame is integrally formed around and joined together with the oil-containing sintered metal powder bearing. In addition, while the fan assembly is rotating, the oil film may formed between the surface of the annular dynamic pressure piece and the end surface of the oil-containing sintered metal powder bearing with the oil retained in the dynamic pressure ditches to allow the annular dynamic pressure piece stably rotates on the end surface of the oil-containing sintered metal powder bearing with acting force and reacting force and reduce the friction force therebetween so as to reduce the noise and vibration thereof and avoid the fan assembly escaping from the plastic frame.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present disclosure. This description is not to be taken in a limiting sense but is made merely for the purpose of describing the general principles of the invention. The scope of the invention should be determined by referencing the appended claims.

Figure 1:
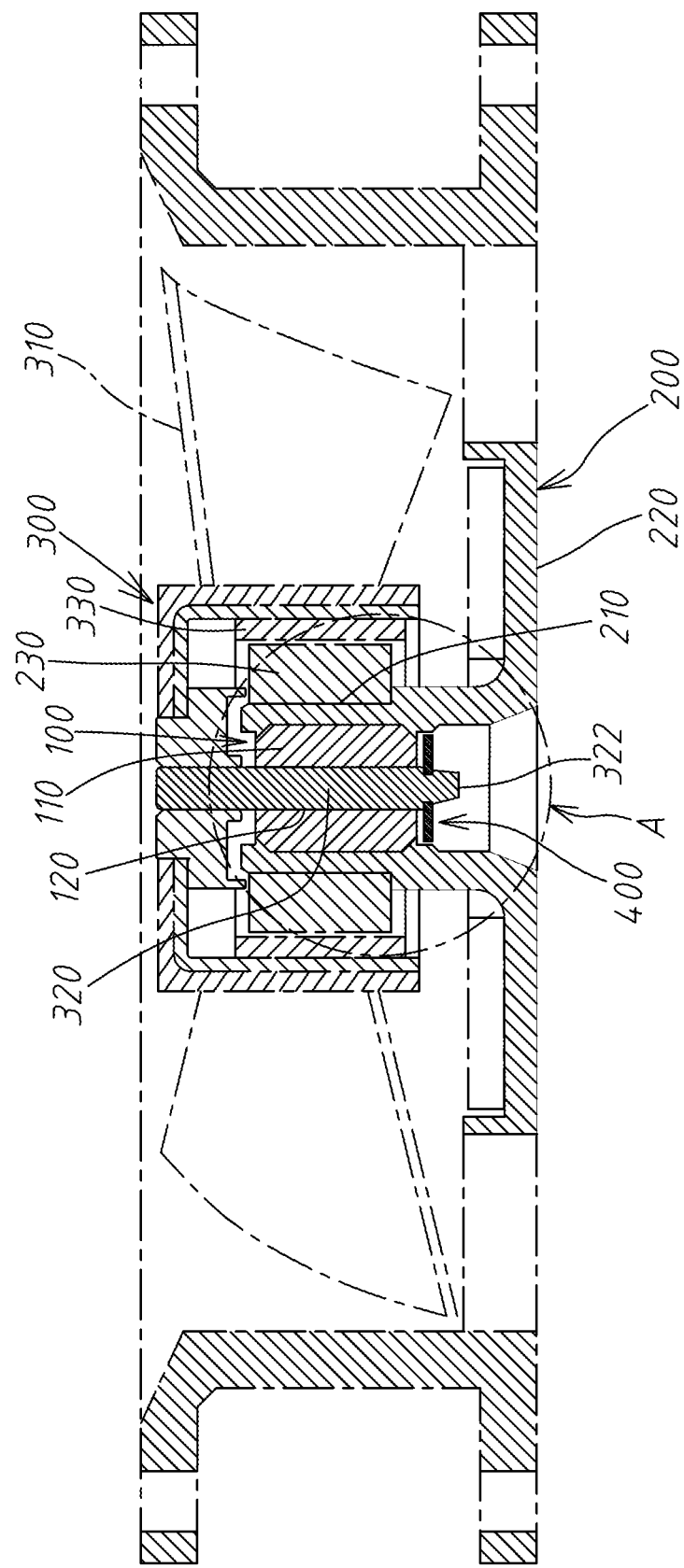
FIG. 1 illustrates a schematic diagram showing a cross-sectional view of a fan dynamic pressure structure having a plastic frame integrally formed around an oil-containing sintered metal powder bearing according to one embodiment of the present invention.
Figure 2:
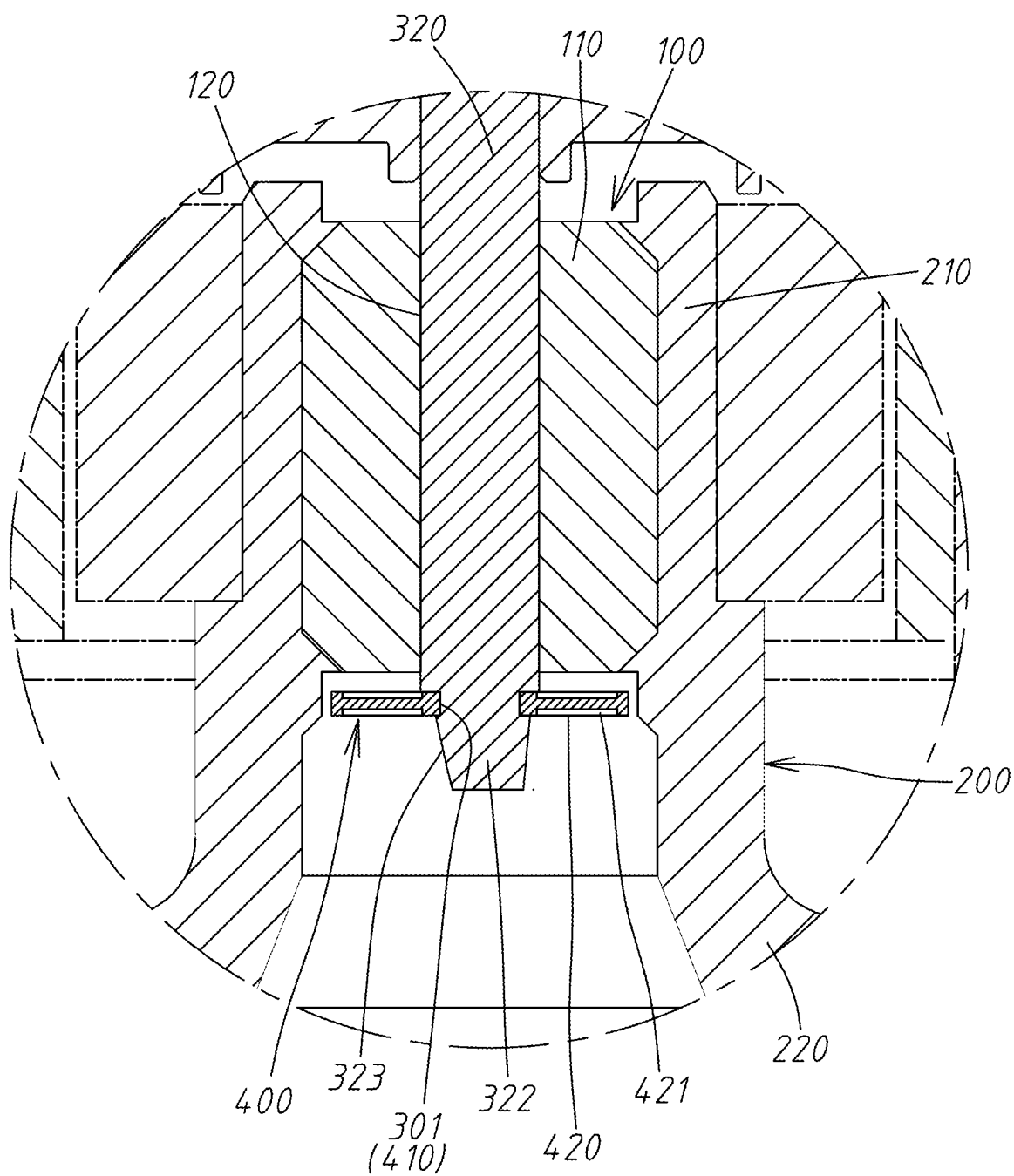
FIG. 2 illustrates an enlarged view showing the portion A of the dynamic pressure structure in FIG. 1.
Figure 3:
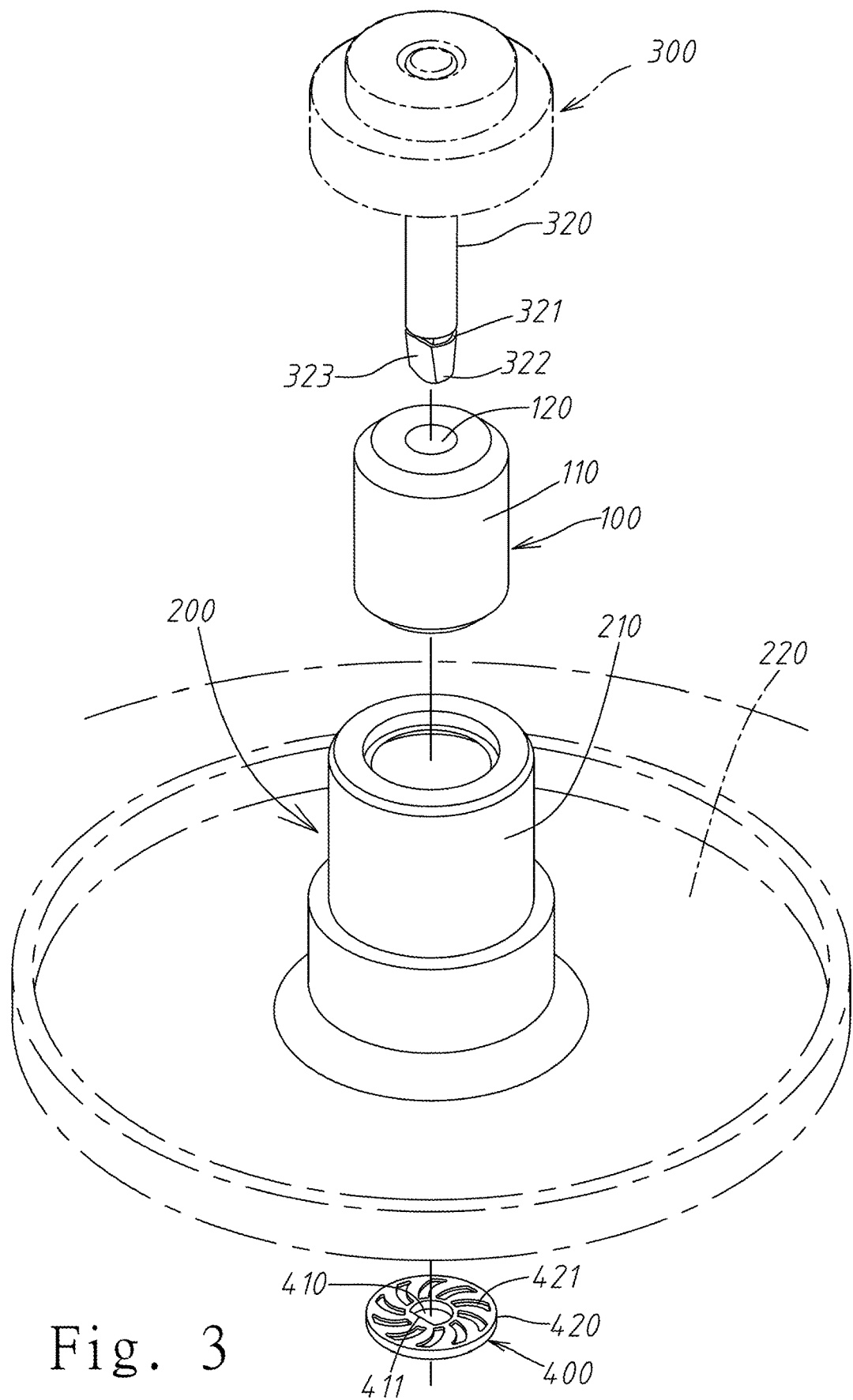
FIG. 3 illustrates an exploded view showing the main part of the dynamic pressure structure shown in FIG. 1.
Figure 4:
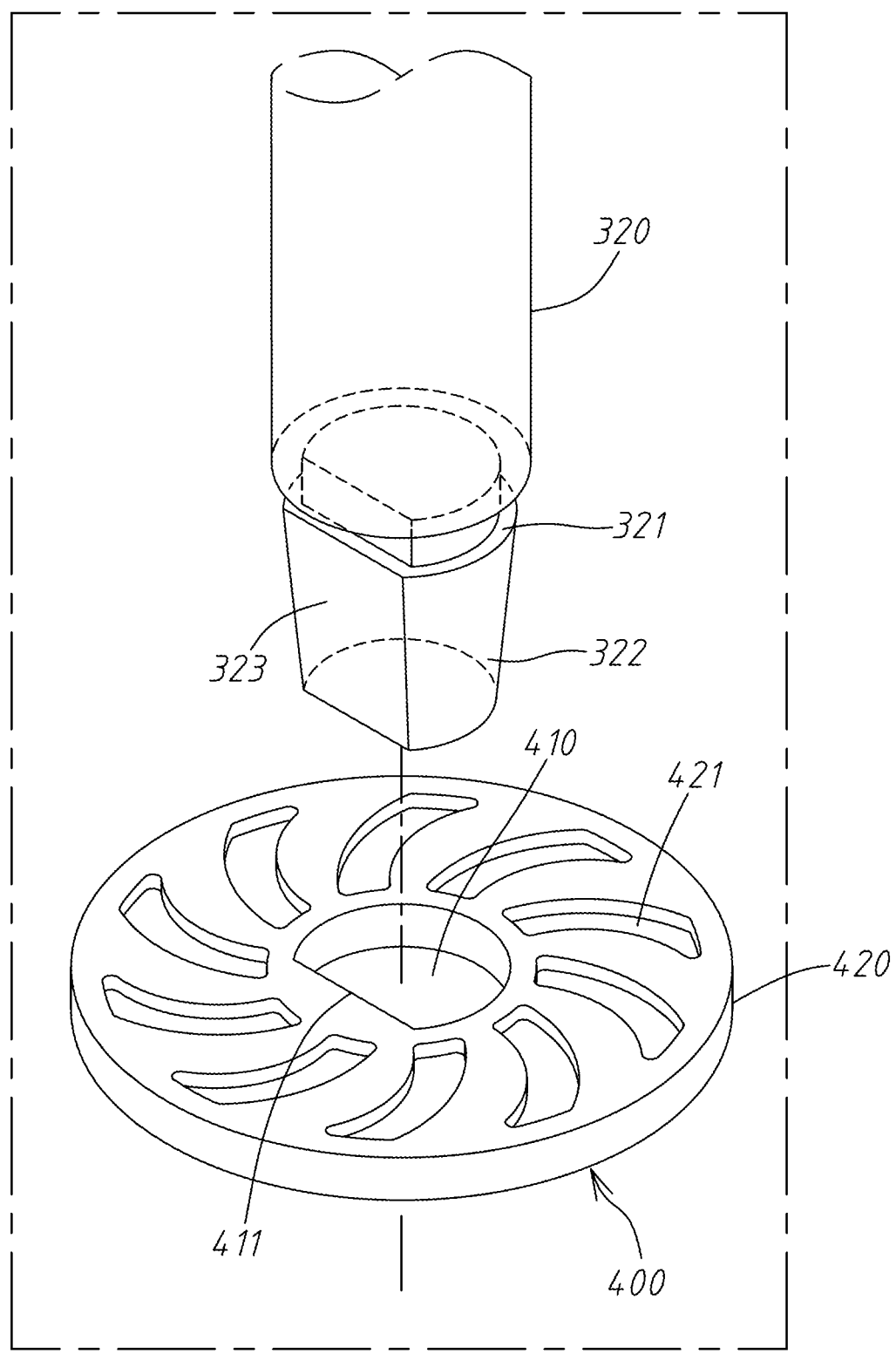
FIG. 4 illustrates an enlarged view showing the dynamic pressure structure shown the axial shaft and the annular dynamic pressure piece in FIG. 3.

Refer to FIGS. 1-4, a fan dynamic pressure structure having a plastic frame integrally formed around an oil-containing sintered metal powder bearing according to one embodiment of the present invention includes an oil-containing sintered metal powder bearing 100, a plastic frame 200, a fan assembly 300 and an annular dynamic pressure piece 400.

The oil-containing sintered metal powder bearing 100 includes a bushing body 110, and the bushing body 110 includes a shaft hole 120 in the center thereof. The plastic frame 200 includes a middle tube 210 and a chassis 220 connected together. The middle tube 210 is integrally formed around the peripheral of the bushing body 110 of the oil-containing sintered metal powder bearing 100.

The fan assembly 300 includes a plurality of fan blades 310 and an axial shaft 320. The axial shaft 320 is formed in the center of the fan assembly 300, and the axial shaft 320 penetrates through the shaft hole 120 of the oil-containing sintered metal powder bearing 100 and protrudes therefrom. The axial shaft 320 includes an annular groove 321. The axial shaft 320 has a cone end portion 322 at one end thereof to guide the annular dynamic pressure piece 400 to be fixed in the annular groove 321 of the axial shaft 320. The cone end portion 322 includes an inclined surface 323. Silicon steel sheets 230 and magnets 330 are equipped between the middle tube 210 of the plastic frame 200 and the fan assembly 300 for rotating the axial shaft 320 in the shaft hole 120 of the oil-containing sintered metal powder bearing 100.

The annular dynamic pressure piece 400 includes an insertion hole 410 and an annular body 420 surrounding the insertion hole 410. The insertion hole 410 includes an inner wall having an edge wall 411 corresponding to the inclined surface 323 of the axial shaft 320. The edge wall 411 of the insertion hole 410 aligns with the inclined surface 323 of the axial shaft 320 and is guided by the cone end portion 322 of the axial shaft 320 so that the insertion hole 410 of the annular dynamic pressure piece 400 can smoothly engage with the annular groove 321 of the axial shaft 320. After the insertion hole 410 engaged with the annular groove 321, the annular dynamic pressure piece 400 is turned an predetermined angle to misalign the edge wall 411 of the annular dynamic pressure piece 400 with the inclined surface 323 of the axial shaft 320 so that the annular dynamic pressure piece 400 is firmly fixed in the annular groove 321 of the axial shaft 320 to reduce the drop rate thereof. A surface, adjacent to the oil-containing sintered metal powder bearing 100, and an opposite surface of the annular dynamic pressure piece 400 have a plurality of curved radial dynamic pressure ditches 421 to reserve the oil for forming oil films on the surfaces of the annular dynamic pressure piece 400.

In some embodiments of the fan dynamic pressure structure having a plastic frame integrally formed around an oil-containing sintered metal powder bearing, the damage and deformation, caused by the conventional press fit process, of the oil-containing sintered metal powder bearing 100 can be avoided because that the plastic frame 200 is integrally formed and joined together with the oil-containing sintered metal powder bearing 100. In addition, while the fan assembly 300 is rotating, the oil film may formed between the surface of the annular dynamic pressure piece 400 and the end surface of the oil-containing sintered metal powder bearing 100 with the oil retained in the dynamic pressure ditches 421 to allow the annular dynamic pressure piece 400 stably rotates on the end surface of the oil-containing sintered metal powder bearing 100 with acting force and reacting force and reduce the friction force therebetween so as to reduce the noise and vibration thereof and avoid the fan assembly 300 escaping from the plastic frame.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A fan dynamic pressure structure having a plastic frame integrally formed around an oil-containing sintered metal powder bearing, comprising:
    an oil-containing sintered metal powder bearing having a bushing body, wherein the bushing body has a shaft hole in a center thereof;
    a plastic frame having a middle tube and a chassis, the middle tube integrally formed around a peripheral of the bushing body;
    a fan assembly having a plurality of fan blades and an axial shaft, wherein the axial shaft is disposed in a center of the fan assembly and the axial shaft penetrates through the shaft hole of the oil-containing sintered metal powder bearing and protrudes downwards, and the axial shaft comprises an annular groove; and
    an annular dynamic pressure piece having an insertion hole and an annular body surrounding the insertion hole, wherein the insertion hole is fixed in the annular groove of the fan assembly, and the annular body has a plurality of curved radial dynamic pressure ditches formed on a surface, adjacent to the oil-containing sintered metal powder bearing, of the annular body.

2. The fan dynamic pressure structure of claim 1, wherein the annular dynamic pressure piece has a plurality of curved radial dynamic pressure ditches on a surface, opposite to the oil-containing sintered metal powder bearing, of the annular body.

3. The fan dynamic pressure structure of claim 2, wherein the axial shaft comprises a cone end portion at an end portion of the axial shaft.

4. The fan dynamic pressure structure of claim 3, wherein the cone end portion comprises an inclined surface, and the insertion hole of the annular dynamic pressure piece comprises an edge wall, on an inner wall of the insertion hole, corresponding to the inclined surface.

\* \* \* \* \*